United States Patent
Suzuki (10) Patent No.: US 8,867,320 B2
(45) Date of Patent: Oct. 21, 2014

(54) TIMEPIECE COVER GLASS AND TIMEPIECE

(75) Inventor: Katsumi Suzuki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 119 days.

(21) Appl. No.: 13/008,316

(22) Filed: Jan. 18, 2011

(65) Prior Publication Data

US 2011/0176396 A1  Jul. 21, 2011

(30) Foreign Application Priority Data

Jan. 19, 2010  (JP) ................ 2010-008810

(51) Int. Cl.
- *G04C 3/00* (2006.01)
- *G04G 17/02* (2006.01)
- *C03C 17/34* (2006.01)
- *G04C 10/02* (2006.01)

(52) U.S. Cl.
CPC ............ *G04C 10/02* (2013.01); *G04G 17/02* (2013.01); *C03C 2218/365* (2013.01); *C03C 17/3435* (2013.01); *C03C 2217/734* (2013.01)
USPC ........................................ 368/205; 368/296

(58) Field of Classification Search
USPC .................. 368/296, 203–205, 294–295
See application file for complete search history.

(56) References Cited

U.S. PATENT DOCUMENTS

| | | | |
|---|---|---|---|
| 6,124,971 A * | 9/2000 | Ouderkirk et al. | 359/485.03 |
| 6,461,736 B1 | 10/2002 | Nagashima et al. | |
| 6,747,716 B2 * | 6/2004 | Kuroiwa et al. | 349/96 |
| 7,081,302 B2 * | 7/2006 | Lemmer et al. | 428/428 |
| 7,648,769 B2 * | 1/2010 | Blacker et al. | 428/432 |
| 2003/0070706 A1 | 4/2003 | Fujioka | |
| 2006/0028920 A1 * | 2/2006 | Kojima et al. | 368/205 |
| 2007/0113881 A1 | 5/2007 | Mellott et al. | |
| 2008/0193635 A1 | 8/2008 | Aroutiounian et al. | |
| 2008/0305254 A1 * | 12/2008 | Tanaka et al. | 427/162 |
| 2010/0027383 A1 | 2/2010 | Suzuki et al. | |
| 2011/0284054 A1 * | 11/2011 | Wanlass | 136/246 |

FOREIGN PATENT DOCUMENTS

| | | |
|---|---|---|
| EP | 1008564 A1 | 6/2000 |
| JP | 09-175840 A | 7/1997 |
| JP | 2003-124491 A | 4/2003 |
| JP | 2004-085231 A | 3/2004 |
| JP | 2004-093437 A | 3/2004 |

(Continued)

OTHER PUBLICATIONS

Sunlight—wikipedia.com; Nov. 16, 2013.*
The Extended European Search Report dated Dec. 14, 2011 for the corresponding European Patent Application No. 11151088.9.

*Primary Examiner* — Sean Kayes
(74) *Attorney, Agent, or Firm* — Global IP Counselors, LLP (57) ABSTRACT

A timepiece cover glass used in a timepiece with a solar battery is provided. The timepiece cover glass covers the solar battery. The timepiece cover glass includes an antireflective layer is formed on at least both sides of the timepiece cover glass. A formula (1) is satisfied. f(x, y, z)≤40 (1), where (f(x, y, z) expresses the absolute value of the difference between the maximum value and minimum value among x, y, and z, where z=550.), xnm represents a wavelength exhibiting a minimum reflectance in a reflectance curve based on the antireflective layer, ynm represents a maximum sensitivity wavelength of the solar battery, and znm represents a maximum visible sensitivity wavelength, and the luminous reflectance is 0.6% or less.

5 Claims, 3 Drawing Sheets

(56) References Cited

FOREIGN PATENT DOCUMENTS

| | | |
|---|---|---|
| JP | 2004-198354 A | 7/2004 |
| JP | 2004-271480 A | 9/2004 |
| JP | 2005-114649 A | 4/2005 |
| JP | 2007-112710 A | 5/2007 |
| JP | 2008-252077 A | 10/2008 |
| JP | 2010-037115 A | 2/2010 |
| WO | WO-2007/017504 A1 | 2/2007 |

* cited by examiner

TIMEPIECE COVER GLASS AND TIMEPIECE

CROSS-REFERENCE TO RELATED APPLICATIONS

This application claims priority to Japanese Patent Application No. 2010-008810 filed on Jan. 19, 2010. The entire disclosure of Japanese Patent Application No. 2010-00810 is hereby incorporated herein by reference.

BACKGROUND

1. Technological Field

The invention relates to a timepiece cover glass and to a timepiece.

2. Background Technology

Timepieces with solar batteries which do not require battery replacement have recently come into use. In a timepiece with a solar battery, a solar battery is disposed on a face plate or a base plate, and the solar battery is covered by a cover glass.

There is demand to improve not only the visibility of the face plate and the hands in such timepieces with solar batteries, but also the power generation efficiency of the solar battery.

In a timepiece cover glass having an antireflective film in order to improve visibility, an antireflective film obtained by introducing nitrogen into a $SiO_2$ film, which is the outermost surface layer, is provided on a glass substrate, as is disclosed, e.g., in Patent Document 1.

3. Related Art

Japanese Laid-open Patent Application No. 2004-198354 (Patent Document 1) is an example of the related art.

SUMMARY

Problems to Be Solved by the Invention

However, even if the timepiece cover glass having an antireflective film disclosed in Patent Document 1 is used as a cover glass of a timepiece with a solar battery, it has been difficult to simultaneously satisfy the demand for visibility of the face plate and hands and the demand for power generation efficiency of the solar battery.

An advantage of the invention is to provide a timepiece cover glass in which the face plate and hands have excellent visibility and the solar battery has excellent power generation efficiency, as well as a timepiece including this timepiece cover glass.

Means Used to Solve the Above-Mentioned Problems

Figure 3:
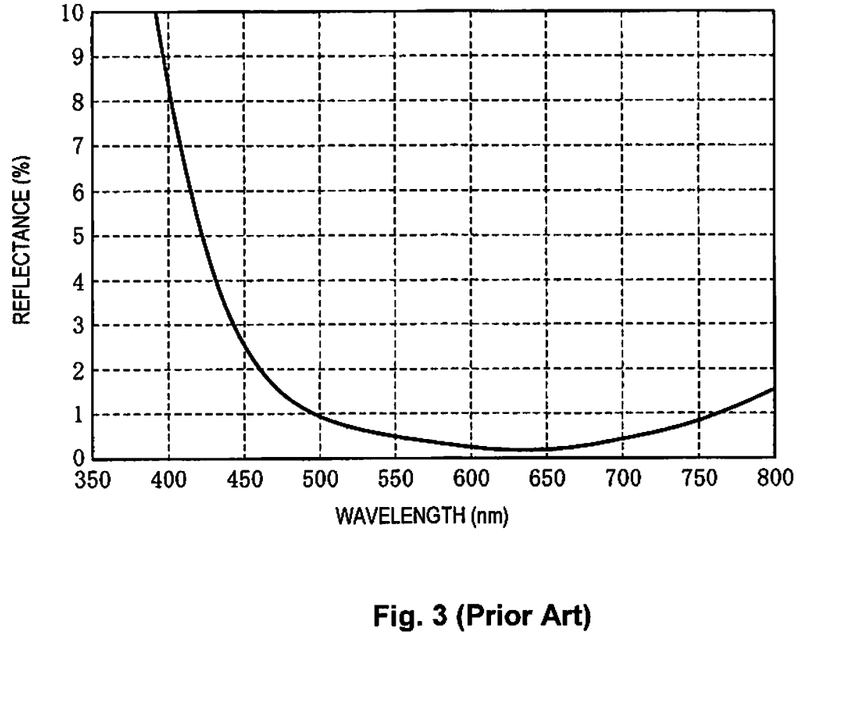
FIG. 3 is a view of a reflectance curve of an antireflective film of a timepiece cover glass according to a prior art.

The inventors have discovered that if there is too great of a difference between the minimum reflectance wavelength of the antireflective layer of the timepiece cover glass, the maximum visible sensitivity wavelength, and the maximum sensitivity wavelength of the solar battery, the visibility of the face plate and hands is insufficient, as is the power generation efficiency of the solar battery. For example, when using a timepiece cover glass in which the configuration of the antireflective layer disclosed in Patent Document 1 was recreated, it was clear that the visibility of the face plate and hands was insufficient as was the power generation efficiency of the solar battery, and the wavelength at minimum reflectance of the antireflective layer was 650 nm (see FIG. 3), a deviation of about 100 nm from both the 550 nm wavelength of maximum sensitivity visible to the human eye and the 520 nm wavelength of maximum sensitivity of an amorphous silicon solar battery.

The term "reflectance curve" refers to a curve that represents reflectance at various wavelengths of visible light, and also refers to a reflectance spectrum. The term "wavelength exhibiting minimum reflectance (minimum reflectance wavelength)" refers to the wavelength when the reflectance exhibits the minimum value in the reflectance curve. In cases of multiple minimum values, the wavelength considered to be the wavelength exhibiting minimum reflectance is a center wavelength between two points that can be intersected by a straight line parallel to the wavelength axis at a reflectance of 2%. Furthermore, the term "maximum sensitivity wavelength of the solar battery" refers to the wavelength when sensitivity reaches a maximum.

The inventors discovered that by forming an antireflective film in which the wavelength difference is within a predetermined range on the timepiece cover glass, visibility of the face plate and hands is improved, as is the power generation efficiency of the solar battery.

The invention was completed based on the above findings.

The invention is a timepiece cover glass used in a timepiece in which a solar battery is provided, the timepiece cover glass covering the solar battery; the timepiece cover glass characterized in that an antireflective layer is formed on at least both sides of the timepiece cover glass; and formula (1) below is satisfied, given that xnm represents a wavelength exhibiting a minimum reflectance in a reflectance curve based on the antireflective layer, ynm represents a maximum sensitivity wavelength of the solar battery, znm represents a maximum visible sensitivity wavelength, and the luminous reflectance is 0.6% or less.

$$f(x,y,z) \leq 40 \tag{1}$$

(f(x, y, z) expresses the absolute value of the difference between the maximum value and minimum value among x, y, and z, where z=550.)

According to the invention, by satisfying formula (1) with the difference between the wavelength of minimum reflectance of the antireflective film of the timepiece cover glass, the wavelength of maximum visible sensitivity, and maximum sensitivity wavelength of the solar battery, the wavelength of minimum reflectance of the antireflective film of the timepiece cover glass and the maximum sensitivity wavelength of the solar battery is kept within a difference of 40 nm or less with respect to the wavelength of maximum visible sensitivity (the maximum wavelength of visible sensitivity of the human eye is 550 nm), and the luminous reflectance is 0.6% or less; therefore, the visibility of the face plate and the hands can be improved as can the power generation efficiency of the solar battery.

The term "luminous reflectance" refers to a value of reflectance that is the average of reflectances at various wavelengths of the visible light range, which are modified according to luminosity.

In the invention, it is preferable that the wavelength considered to be the wavelength exhibiting the minimum reflectance is a center wavelength between two points on the reflectance curve that can be intersected by a straight line running parallel to the wavelength axis at a reflectance of 2%.

According to the invention, when the reflectance curve has two or more minimum values, if the center wavelength is considered to be the minimum reflectance wavelength as in the invention, formula (1) above is satisfied, and the luminous reflectance is 0.6% or less, the visibility of the face plate and hands can be improved as can the power generation efficiency of the solar battery.

Furthermore, in the invention, the antireflective layer is an inorganic multilayer film obtained by a high-refraction layer and a low-refraction layer being stacked in an alternating fashion.

According to the invention, since the antireflective layer is formed by alternately stacking high-refraction layers and low-refraction layers, reflectance can be reduced and the antireflective effect can be improved. Furthermore, it is easy to control the antireflective effect and light transmittance by increasing or decreasing the number of stacked layers.

In the invention it is preferable that the high-refraction layer includes silicon nitride and the low-refraction layer includes silicon oxide.

According to the invention, since the antireflective layer is configured by alternately stacking high-refraction layers composed of silicon nitride and low-refraction layers composed of silicon oxide, the antireflective effect and scratch resistance can be improved.

The timepiece of the invention is characterized in including the timepiece cover glass according to the invention described above.

According to the invention, it is possible to provide a timepiece in which the face plate and hands have excellent visibility and the solar battery has excellent power generation efficiency.

Effect of the Invention

According to the invention, it is possible to provide a timepiece cover glass in which the face plate and hands have excellent visibility and the solar battery has excellent power generation efficiency, as well as to provide as a timepiece including this timepiece cover glass.

DETAILED DESCRIPTION OF EXEMPLARY EMBODIMENTS

Figure 1:
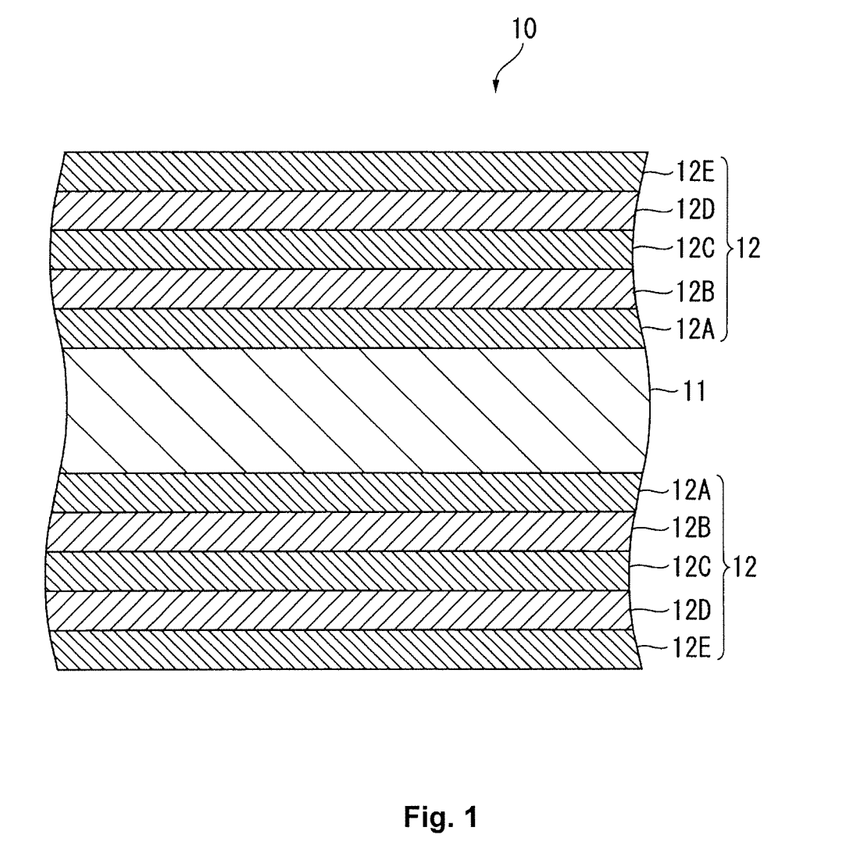
FIG. 1 is a schematic view showing a cross section of the cover glass according to an embodiment of the invention.

FIG. 1 is a schematic view showing a cross section of a timepiece cover glass 10 ("cover glass 10" below) according to an embodiment of the invention. The cover glass 10 includes a transparent substrate 11, and an antireflective layer 12 formed on top of the substrate.

Material of Substrate 11

The substrate 11 is made of an inorganic oxide, possible examples of which including sapphire glass, quartz glass, soda glass, and the like. Sapphire glass in particular is preferable as the material of the cover glass 10 for its hardness and transparency.

Configuration of Antireflective Layer 12

The antireflective layer 12 is formed on the top of the substrate 11, and is a multilayer film obtained by alternately stacking inorganic thin films having different refractive indexes. In the cover glass 10 shown in FIG. 1, the antireflective layer 12 is composed of five layers, stacked up from the substrate 11 in the following sequence: 12A (a low-refraction layer), 12B (a high-refraction layer), 12C (a low-refraction layer), 12D (a high-refraction layer), and 12E (a low-refraction layer). These five layers are formed on both sides of the substrate 11.

The high-refraction layers 12B, 12D are formed from silicon nitride (SiNx), and the low-refraction layers 12A, 12C, 12E are formed from silicon oxide ($SiO_2$).

An antireflective layer having the desired minimum reflectance wavelength and luminous reflectance can be obtained by appropriately setting the stacked configuration of the antireflective layer (the material, the number of layers, the stacking sequence, and the refractive indexes of the layers) using an optical design simulation or another method.

The reflectance of the antireflective layer 12 is measured using a spectrophotometer, and a reflectance curve is drawn. The wavelength occurring when the minimum reflectance is exhibited in this reflectance curve is designated as the minimum reflectance wavelength. In cases in which the reflectance curve has two or more minimum values, the wavelength considered to be the minimum reflectance wavelength is a center wavelength between two points on the reflectance curve that can be intersected by a straight line parallel to the wavelength axis at a reflectance of 2%.

The thickness of the outermost layer (the low-refraction layer 12E) composed of silicon oxide is preferably 70 to 110 nm, or more preferably 75 to 105 nm. The thickness of the silicon nitride layer (the high-refraction layer 12D) adjacent to the outermost layer is preferably 50 to 115 nm, or more preferably 55 to 110 nm. If the layer thicknesses are outside of these ranges, the reflectance of the antireflective layer tends to increase.

Step of Forming Antireflective Layer 12

When the antireflective layer 12 described above is formed on the surface of the substrate 11, sputtering is used. The usual method used when forming an inorganic thin film can be applied as the sputtering, but in the present embodiment, high-frequency sputtering is performed in an atmosphere of Ar gas, nitrogen gas, or another inert gas, with Si as the target, foaming high-refraction layers 12B, 12D composed of silicon nitride; and high-frequency sputtering is performed in a mixed gas atmosphere composed of oxygen gas and Ar, forming low-refraction layers 12A, 12C, 12E composed of silicon oxide.

The antireflective layer 12 composed of the five previously described layers is formed on both sides of the substrate 11, and the cover glass 10 is thereby manufactured.

When the previously-described sputtering is performed, it is preferable to include a heating step for heating the substrate 11 to 100° C. or greater, for the sake of improving the hardness and adhesiveness of the antireflective film.

For the sake of improving the adhesiveness between the substrate 11 and the antireflective layer 12, it is preferable to include a reverse sputtering step for removing accretions on the surface of the substrate 11 before the antireflective layer 12 is formed by sputtering, because the surface of the substrate 11 can be washed.

Configuration of Timepiece

Figure 2:
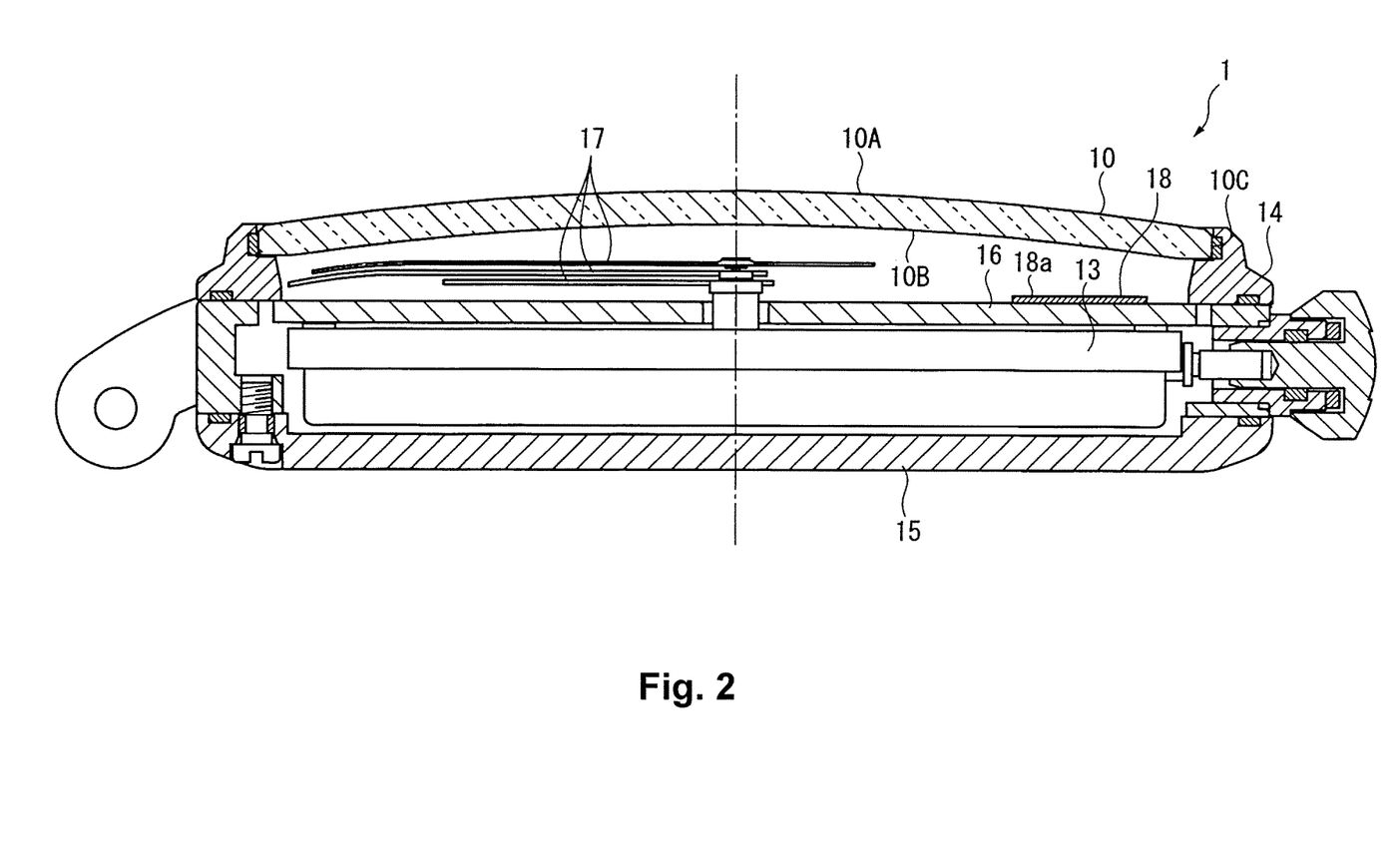
FIG. 2 is a cross-sectional view of a timepiece including the cover glass according to the present embodiment.

FIG. 2 shows a cross-sectional view of a timepiece including the cover glass 10.

In the timepiece 1 of the present embodiment as shown in FIG. 2, the cover glass 10 is provided on a case 14 for housing the timepiece body (movement) 13. A back cover 15 is provided to the case 14.

The bulk surface portion of the cover glass 10 of the present embodiment is herein composed of a front surface part 10A, a rear surface part 10B, and a side surface part 10C. The front surface part 10A is equivalent to an outer side portion of the cover glass 10. The rear surface part 10B is equivalent to an inner side portion of the cover glass 10, and is made to face a face plate 16 and indicator hands 17.

In the present embodiment, the previously-described antireflective layers 12 are positioned on the front surface part 10A and the rear surface part 10B of the cover glass 10.

A solar battery 18 is mounted on the face plate 16 as shown in FIG. 2. A light-receiving surface 18a of the solar battery 18 faces the rear surface part 10B of the cover glass 10. The peak of the sensitivity (maximum sensitivity) of the solar battery 18 differs depending on the type of solar battery. For example, an amorphous silicon solar battery (a-Si solar battery) has a sensitivity peak in the visible light wavelength range, and a single-crystal silicon solar battery (c-Si solar battery) has a sensitivity peak in the infrared wavelength range. The wavelength at the sensitivity peak (maximum sensitivity) is referred to as the maximum sensitivity wavelength.

In the present embodiment, an a-Si solar battery is used, and the maximum sensitivity wavelength is in a range of approximately 510 to 530 nm.

In the timepiece 1, the minimum reflectance wavelength xnm of the antireflective layer 12 and the maximum sensitivity wavelength ynm of the solar battery 18 satisfy the formula below with the maximum visible sensitivity wavelength (550 nm) which is the wavelength of light that can be perceived most strongly by the human eye, and the luminous reflectance is 0.6% or less.

$$f(x,y,550) \leq 40 \quad (2)$$

(The formula $f(x, y, 550)$ herein expresses the absolute value of the difference between the maximum and minimum values among x, y, and 550.)

For example, when x=530 and y=520, the minimum value is y=520 and the maximum value is 550; therefore $f(x, y, 550)=30$.

According to the embodiment described above, the following effects are achieved.

(1) In the timepiece 1, the relationships of the wavelength differences between the reflectance center wavelength of the antireflective layers 12 positioned on the front surface part 10A and rear surface part 10B of the cover glass 10, the maximum sensitivity wavelength of the solar battery 18 mounted on the face plate 16, and the maximum visible sensitivity wavelength satisfy formula (2) above, and the luminous reflectance is 0.6% or less; therefore, the visibility of the face plate and hands and the power generation efficiency of the solar battery can be improved.

(2) Since the antireflective layer 12 is an inorganic multilayer film made by alternately stacking the high-refraction layers 12B, 12D and the low-refraction layers 12A, 12C, 12E, there is little reflection of light from the cover glass 10, and an excellent antireflective effect can be achieved.

(3) The antireflective effect and scratch resistance can be improved because the high-refraction layers 12B, 12D are composed of silicon nitride and the low-refraction layers 12A, 12C, 12E are composed of silicon oxide.

(4) Since antireflective layers 12 are positioned on the front surface part 10A and rear surface part 10B of the cover glass 10, visibility and power generation efficiency of the solar battery are further improved than when an antireflective layer 12 is positioned on only one of either the front surface part 10A or rear surface part 10B of the cover glass 10.

The invention is not limited to the embodiment described above; various improvements and modifications can be made within a scope allowing the objects of the invention to be achieved.

For example, in the embodiment described above, the configurations of the antireflective layers 12 positioned on the front surface part 10A and rear surface part 10B of the cover glass 10 are foamed to be symmetrical about the substrate 11, but are not limited to this formation, and the number of films and materials may differ between the front surface and back surface of the substrate 11. However, it is preferred that the configuration on the front surface side of the substrate 11 be in the sequence of 12A (a low-refraction layer), 12B (a high-refraction layer), 12C (a low-refraction layer), 12D (a high-refraction layer), and 12E (a low-refraction layer), starting from the substrate.

In the embodiment described above, the solar battery 18 is mounted on part of the face plate 16 and the light-receiving surface 18a of the solar battery 18 faces the rear surface part 10B of the cover glass 10 as shown in FIG. 2, but the configuration is not limited to this example. For example, to increase the light-receiving surface area of the light-receiving surface of the solar battery, nearly the entire top surface of the face plate may be fashioned into a light-receiving surface, or the light-receiving surface may be covered by a translucent member and an insignia, alphanumeric characters, or the like may be formed in this translucent member to create the face plate, ensuring an amount of light transmission and improving the design. Another option is a configuration in which a solar battery is mounted on the back surface side of the face plate and light passing through the cover glass is guided to the light-receiving surface by a light-guiding plate or another light-guiding member provided in the edge vicinity of the face plate, which may ensure an amount of light directed onto the light-receiving surface and further improve the design of the face plate.

Furthermore, high hardness sapphire glass is preferred as the substrate of the translucent member, but the use of quartz glass, soda glass, and other types of glass may also be considered.

The cover glass of the invention is not limited to a cover member used in a timepiece, and can also be suitably used as a cover member of an information display in cellular telephones, portable information devices, measurement devices, digital cameras, and other various devices having a solar battery.

WORKING EXAMPLES

The invention is described in further detail hereinbelow according to working examples and comparative examples. Specifically, various evaluations were conducted after using common sapphire glass as the substrate of the timepiece cover glass and forming a predetermined antireflective layer on the front surface thereof.

Working Examples 1 to 33, Comparative Examples 1 to 6

Pretreatment of Substrate

The sapphire glass was immersed for ten minutes in hot concentrated sulfuric acid at 120° C., then washed well with pure water, and dried for 30 minutes at atmospheric pressure in an oven set to 120° C. Next, the sapphire glass was placed inside a sputtering apparatus, and the interior of the apparatus was brought to a pressure of $10^{-6}$ Ton while being heated to 120° C. Ar gas was then introduced into the apparatus, and the surface of the sapphire glass was cleaned by reverse sputtering at 0.8 mTorr.

Antireflective Layer Formation Step

Using silicon as the target, reactive sputtering was performed under the following conditions, and an antireflective layer composed of high-refraction layers and low-refraction layers (four to nine layers, on one side or both sides) was formed on the surface of a substrate made of sapphire glass. For the working examples, antireflective layers were formed on both sides of the sapphire glass substrate, and for the comparative examples, either antireflective layers were not formed on the substrate or an antireflective layer was formed on only one side.

The conditions under which the high-refraction layers and low-refraction layers were formed were as follows.

High-Refraction Layer: Silicon Nitride (SiNx)
    Nitrogen gas: 10.0 sccm
    Argon gas: 10.0 sccm
    Sputtering power: 2.0 kW Low-Refraction Layer: Silicon Oxide ($SiO_2$)
    Oxygen gas: 10.0 sccm
    Argon gas: 10.0 sccm
    Sputtering power: 1.5 kW The specific configurations (types of layers, number of layers, thickness of layers) of the antireflective layers, the luminous reflectances of the antireflective layers of the various configurations, and the minimum reflectance wavelengths are shown in Table 1 in the Working Examples 1 to 11 and the Comparative Examples 1 to 2. Furthermore, for Working Examples 1 to 11 and Comparative Examples 1 to 2, Table 1 shows the maximum and minimum values of the minimum reflectance wavelengths x (nm), the maximum sensitivity wavelengths y (nm) of the solar batteries, and the wavelengths in the maximum visible sensitivity wavelengths z (nm); as well as the values of f (x, y, z), which is the absolute value of the difference between the maximum value and the minimum value.

TABLE 1

| | | Film-formation surface | Layer configuration | Total films formed | Luminous reflectance | Minimum reflectance wavelength | Wavelength maximum value | Wavelength minimum value | f (x, y, z) | Solar battery power generation efficiency |
|---|---|---|---|---|---|---|---|---|---|---|
| Working Examples | 1 | both sides | $SiO_2$(82 nm)/SiNx(79 nm)/$SiO_2$(18 nm)/SiNx(17 nm)/$SiO_2$(151 nm)/sapphire | 5 | 0.5% | 530 nm | 550 | 510 | 40 | 0.985 |
| | 2 | both sides | $SiO_2$(88 nm)/SiNx(61 nm)/$SiO_2$(20 nm)/SiNx(22 nm)/$SiO_2$(159 nm)/sapphire | 5 | 0.5% | 530 nm | 550 | 510 | 40 | 0.985 |
| | 3 | both sides | $SiO_2$(84 nm)/SiNx(97 nm)/$SiO_2$(39 nm)/SiNx(26 nm)/$SiO_2$(52 nm)/SiNx(140 nm)/sapphire | 6 | 0.5% | 550 nm | 550 | 510 | 40 | 0.975 |
| | 4 | both sides | $SiO_2$(94 nm)/SiNx(73 nm)/$SiO_2$(34 nm)/SiNx(35 nm)/$SiO_2$(48 nm)/SiNx(140 nm)/sapphire | 6 | 0.5% | 540 nm | 550 | 510 | 40 | 0.980 |
| | 5 | both sides | $SiO_2$(99 nm)/SiNx(59 nm)/$SiO_2$(43 nm)/SiNx(33 nm)/$SiO_2$(51 nm)/SiNx(141 nm)/sapphire | 6 | 0.5% | 540 nm | 550 | 510 | 40 | 0.980 |
| | 6 | both sides | $SiO_2$(86 nm)/SiNx(109 nm)/$SiO_2$(17 nm)/SiNx(46 nm)/$SiO_2$(32 nm)/SiNx(41 m)/$SiO_2$(9 nm)/sapphire | 7 | 0.5% | 510 nm | 550 | 510 | 40 | 0.995 |
| | 7 | both sides | $SiO_2$(85 nm)/SiNx(98 nm)/$SiO_2$(37 nm)/SiNx(26 nm)/$SiO_2$(62 nm)/SiNx(40 m)/$SiO_2$(22 nm)/SiNx(33 m)/sapphire | 8 | 0.5% | 550 nm | 550 | 510 | 40 | 0.975 |
| | 8 | both sides | $SiO_2$(94 nm)/SiNx(70 nm)/$SiO_2$(34 nm)/SiNx(32 nm)/$SiO_2$(63 nm)/SiNx(35 m)/$SiO_2$(26 nm)/SiNx(36 m)/sapphire | 8 | 0.5% | 540 nm | 550 | 510 | 40 | 0.980 |
| | 9 | both sides | $SiO_2$(102 nm)/SiNx(59 nm)/$SiO_2$(41 nm)/SiNx(36 nm)/ | 8 | 0.5% | 550 nm | 550 | 510 | 40 | 0.975 |

TABLE 1-continued

|  |  | Film-formation surface | Layer configuration | Total films formed | Luminous reflectance | Minimum reflectance wavelength | Wavelength maximum value | Wavelength minimum value | f (x, y, z) | Solar battery power generation efficiency |
|---|---|---|---|---|---|---|---|---|---|---|
|  | 10 | both sides | SiO$_2$(48 nm)/<br>SiN$x$(61 m)/<br>SiO$_2$(11 nm)/<br>SiN$x$(47 m)/sapphire<br>SiO$_2$(81 nm)/SiN$x$(107 nm)/<br>SiO$_2$(26 nm)/<br>SiN$x$(22 nm)/<br>SiO$_2$(53 nm)/<br>SiN$x$(26 m)/<br>SiO$_2$(29 nm)/<br>SiN$x$(37 m)/<br>SiO$_2$(9 nm)/<br>sapphire | 9 | 0.5% | 520 nm | 550 | 510 | 40 | 0.990 |
|  | 11 | both sides | SiO$_2$(90 nm)/SiN$x$(79 nm)/<br>SiO$_2$(23 nm)/<br>SiN$x$(30 nm)/<br>SiO$_2$(54 nm)/<br>SiN$x$(24 m)/<br>SiO$_2$(37 nm)/<br>SiN$x$(31 m)/<br>SiO$_2$(9 nm)/<br>sapphire | 9 | 0.5% | 530 nm | 550 | 510 | 40 | 0.985 |
| Comparative Examples | 1 | — | sapphire | 0 | 14.0% | — | 550 | 510 | 40 | 0.850 |
|  | 2 | one side | SiO$_2$(88 nm)/SiN$x$(91 nm)/<br>SiO$_2$(12 nm)/<br>SiN$x$(27 nm)/sapphire | 4 | 7.4% | 520 nm | 550 | 510 | 40 | 0.921 |

Maximum sensitivity wavelength [nm] of solar battery: 510
Maximum luminous sensitivity wavelength [nm]: 550

Method for Measuring Luminous Reflectance (%)

For the luminous reflectance values shown in Table 1, the reflectance of reference light incident at an angle of 90° relative to the substrate surface was found, and the luminous reflectance was calculated based on an integrated value of a value obtained by multiplying the reference reflectance by the visible sensitivity for the incident angle of 90° for various wavelengths in the visible light range. The reflectance was measured using an USPM-RU lens reflectance measurement device (Olympus Optical).

Measurement of Solar Battery Power Generation Efficiency

A solar battery was placed facing the back surface side of the sapphire glass substrate having the antireflective layer shown in Table 1, and the power generation efficiency was measured by exposure to light from the front surface side of the sapphire glass substrate. The power generation efficiency was measured according to JIS C 8907.

Three types of amorphous silicon batteries (AT-2600B (Sanyo Electric)) were used as the solar batteries. The maximum sensitivity wavelengths of the solar batteries were 510 nm, 520 nm, and 530 nm, respectively.

Table 1 shows the results of measuring power generation efficiency using a solar battery whose maximum sensitivity wavelength is 510 nm for the sapphire glass substrates having antireflective layers as well as the sapphire glass substrates not having antireflective layers in Working Examples 1 to 11 and Comparative Examples 1 to 2.

For the sapphire glass substrates of Working Examples 1 to 11 and Comparative Examples 1 to 2, Table 2 shows the results of measuring power generation efficiency using a solar battery whose maximum sensitivity wavelength is 520 nm, as well as f(x, y, z) in Working Examples 12 to 22 and Comparative Examples 3 to 4; while Table 3 similarly shows the results of measuring power generation efficiency using a solar battery whose maximum sensitivity wavelength is 530 nm, as well as f(x, y, z) in Working Examples 23 to 33 and Comparative Examples 5 to 6.

TABLE 2

|  |  | Film-formation surface | Layer configuration | Total films formed | Luminous reflectance | Minimum reflectance wavelength | Wavelength maximum value | Wavelength minimum value | f (x, y, z) | Solar battery power generation efficiency |
|---|---|---|---|---|---|---|---|---|---|---|
| Working Examples | 12 | both sides | SiO$_2$(82 nm)/SiN$x$(79 nm)/<br>SiO$_2$(18 nm)/<br>SiN$x$(17 nm)/<br>SiO$_2$(151 nm)/<br>sapphire | 5 | 0.5% | 530 nm | 550 | 520 | 30 | 0.990 |
|  | 13 | both sides | SiO$_2$(88 nm)/SiN$x$(61 nm)/<br>SiO$_2$(20 nm)/<br>SiN$x$(22 nm)/<br>SiO$_2$(159 nm)/<br>sapphire | 5 | 0.5% | 530 nm | 550 | 520 | 30 | 0.990 |
|  | 14 | both sides | SiO$_2$(84 nm)/SiN$x$(97 nm)/<br>SiO$_2$(39 nm)/<br>SiN$x$(26 nm)/ | 6 | 0.5% | 550 nm | 550 | 520 | 30 | 0.980 |

TABLE 2-continued

| | | Film-formation surface | Layer configuration | Total films formed | Luminous reflectance | Minimum reflectance wavelength | Wavelength maximum value | Wavelength minimum value | f (x, y, z) | Solar battery power generation efficiency |
|---|---|---|---|---|---|---|---|---|---|---|
| | 15 | both sides | SiO$_2$(52 nm)/SiN$x$(140 nm)/sapphire SiO$_2$(94 nm)/SiN$x$(73 nm)/ SiO$_2$(34 nm)/ SiN$x$(35 nm)/ SiO$_2$(48 nm)/ SiN$x$(140 nm)/sapphire | 6 | 0.5% | 540 nm | 550 | 520 | 30 | 0.985 |
| | 16 | both sides | SiO$_2$(99 nm)/SiN$x$(59 nm)/ SiO$_2$(43 nm)/ SiN$x$(33 nm)/ SiO$_2$(51 nm)/ SiN$x$(141 nm)/sapphire | 6 | 0.5% | 540 nm | 550 | 520 | 30 | 0.985 |
| | 17 | both sides | SiO$_2$(86 nm)/SiN$x$(109 nm)/ SiO$_2$(17 nm)/ SiN$x$(46 nm)/ SiO$_2$(32 nm)/ SiN$x$(41 m)/ SiO$_2$(9 nm)/ sapphire | 7 | 0.5% | 510 nm | 550 | 510 | 40 | 0.990 |
| | 18 | both sides | SiO$_2$(85 nm)/SiN$x$(98 nm)/ SiO$_2$(37 nm)/ SiN$x$(26 nm)/ SiO$_2$(62 nm)/ SiN$x$(40 m)/ SiO$_2$(22 nm)/ SiN$x$(33 m)/sapphire | 8 | 0.5% | 550 nm | 550 | 520 | 30 | 0.980 |
| | 19 | both sides | SiO$_2$(94 nm)/SiN$x$(70 nm)/ SiO$_2$(34 nm)/ SiN$x$(32 nm)/ SiO$_2$(63 nm)/ SiN$x$(35 m)/ SiO$_2$(26 nm)/ SiN$x$(36 m)/sapphire | 8 | 0.5% | 540 nm | 550 | 520 | 30 | 0.985 |
| | 20 | both sides | SiO$_2$(102 nm)/SiN$x$(59 nm)/ SiO$_2$(41 nm)/ SiN$x$(36 nm)/ SiO$_2$(48 nm)/ SiN$x$(61 m)/ SiO$_2$(11 nm)/ SiN$x$(47 m)/sapphire | 8 | 0.5% | 550 nm | 550 | 520 | 30 | 0.980 |
| | 21 | both sides | SiO$_2$(81 nm)/SiN$x$(107 nm)/ SiO$_2$(26 nm)/ SiN$x$(22 nm)/ SiO$_2$(53 nm)/ SiN$x$(26 m)/ SiO$_2$(29 nm)/ SiN$x$(37 m)/ SiO$_2$(9 nm)/ sapphire | 9 | 0.5% | 520 nm | 550 | 520 | 30 | 0.995 |
| | 22 | both sides | SiO$_2$(90 nm)/SiN$x$(79 nm)/ SiO$_2$(23 nm)/ SiN$x$(30 nm)/ SiO$_2$(54 nm)/ SiN$x$(24 m)/ SiO$_2$(37 nm)/ SiN$x$(31 m)/ SiO$_2$(9 nm)/ sapphire | 9 | 0.5% | 530 nm | 550 | 520 | 30 | 0.990 |
| Comparative Examples | 3 | — | sapphire | 0 | 14.0% | — | 550 | 520 | 30 | 0.850 |
| | 4 | one side | SiO$_2$(88 nm)/SiN$x$(91 nm)/ SiO$_2$(12 nm)/ SiN$x$(27 nm)/sapphire | 4 | 7.4% | 520 nm | 550 | 520 | 30 | 0.926 |

Maximum sensitivity wavelength [nm] of solar battery: 520
Maximum luminous sensitivity wavelength [nm]: 550

TABLE 3

| | | Film-formation surface | Layer configuration | Total films formed | Luminous reflectance | Minimum reflectance wavelength | Wavelength maximum value | Wavelength minimum value | f (x, y, z) | Solar battery power generation efficiency |
|---|---|---|---|---|---|---|---|---|---|---|
| Working Examples | 23 | both sides | SiO$_2$(82 nm)/SiN$x$(79 nm)/ SiO$_2$(18 nm)/ SiN$x$(17 nm)/ SiO$_2$(151 nm)/ sapphire | 5 | 0.5% | 530 nm | 550 | 530 | 20 | 0.995 |
| | 24 | both sides | SiO$_2$(88 nm)/SiN$x$(61 nm)/ SiO$_2$(20 nm)/ SiN$x$(22 nm)/ SiO$_2$(159 nm)/ sapphire | 5 | 0.5% | 530 nm | 550 | 530 | 20 | 0.995 |
| | 25 | both sides | SiO$_2$(84 nm)/SiN$x$(97 nm)/ SiO$_2$(39 nm)/ SiN$x$(26 nm)/ SiO$_2$(52 nm)/ SiN$x$(140 nm)/sapphire | 6 | 0.5% | 550 nm | 550 | 530 | 20 | 0.985 |
| | 26 | both sides | SiO$_2$(94 nm)/SiN$x$(73 nm)/ SiO$_2$(34 nm)/ SiN$x$(35 nm)/ SiO$_2$(48 nm)/ SiN$x$(140 nm)/sapphire | 6 | 0.5% | 540 nm | 550 | 530 | 20 | 0.990 |
| | 27 | both sides | SiO$_2$(99 nm)/SiN$x$(59 nm)/ SiO$_2$(43 nm)/ SiN$x$(33 nm)/ SiO$_2$(51 nm)/ SiN$x$(141 nm)/sapphire | 6 | 0.5% | 540 nm | 550 | 530 | 20 | 0.990 |
| | 28 | both sides | SiO$_2$(86 nm)/SiN$x$(109 nm)/ SiO$_2$(17 nm)/ SiN$x$(46 nm)/ SiO$_2$(32 nm)/ SiN$x$(41 m)/ SiO$_2$(9 nm)/ sapphire | 7 | 0.5% | 510 nm | 550 | 510 | 40 | 0.985 |
| | 29 | both sides | SiO$_2$(85 nm)/SiN$x$(98 nm)/ SiO$_2$(37 nm)/ SiN$x$(26 nm)/ SiO$_2$(62 nm)/ SiN$x$(40 m)/ SiO$_2$(22 nm)/ SiN$x$(33 m)/sapphire | 8 | 0.5% | 550 nm | 550 | 530 | 20 | 0.985 |
| | 30 | both sides | SiO$_2$(94 nm)/SiN$x$(70 nm)/ SiO$_2$(34 nm)/ SiN$x$(32 nm)/ SiO$_2$(63 nm)/ SiN$x$(35 m)/ SiO$_2$(26 nm)/ SiN$x$(36 m)/sapphire | 8 | 0.5% | 540 nm | 550 | 530 | 20 | 0.990 |
| | 31 | both sides | SiO$_2$(102 nm)/SiN$x$(59 nm)/ SiO$_2$(41 nm)/ SiN$x$(36 nm)/ SiO$_2$(48 nm)/ SiN$x$(61 m)/ SiO$_2$(11 nm)/ SiN$x$(47 m)/sapphire | 8 | 0.5% | 550 nm | 550 | 530 | 20 | 0.985 |
| | 32 | both sides | SiO$_2$(81 nm)/SiN$x$(107 nm)/ SiO$_2$(26 nm)/ SiN$x$(22 nm)/ SiO$_2$(53 nm)/ SiN$x$(26 m)/ SiO$_2$(29 nm)/ SiN$x$(37 m)/ SiO$_2$(9 nm)/ sapphire | 9 | 0.5% | 520 nm | 550 | 530 | 30 | 0.990 |
| | 33 | both sides | SiO$_2$(90 nm)/SiN$x$(79 nm)/ SiO$_2$(23 nm)/ SiN$x$(30 nm)/ SiO$_2$(54 nm)/ SiN$x$(24 m)/ SiO$_2$(37 nm)/ SiN$x$(31 m)/ SiO$_2$(9 nm)/ sapphire | 9 | 0.5% | 530 nm | 550 | 530 | 20 | 0.995 |

TABLE 3-continued

| | | Film-formation surface | Layer configuration | Total films formed | Luminous reflectance | Minimum reflectance wavelength | Wavelength maximum value | Wavelength minimum value | f (x, y, z) | Solar battery power generation efficiency |
|---|---|---|---|---|---|---|---|---|---|---|
| Comparative Examples | 5 | — | sapphire | 0 | 14.0% | — | 550 | 530 | — | 0.850 |
| | 6 | one side | SiO$_2$(88 nm)/SiN$x$(91 nm)/ SiO$_2$(12 nm)/ SiN$x$(27 nm)/sapphire | 4 | 7.4% | 520 nm | 550 | 530 | 30 | 0.921 |

Maximum sensitivity wavelength [nm] of solar battery: 530
Maximum luminous sensitivity wavelength [nm]: 550

Evaluation Results

From the results of Tables 1 to 3 and Working Examples 1 to 33, it is clear that excellent visibility and solar battery power generation efficiency can be achieved by selecting the solar battery so that formula (1) above is satisfied, forming the antireflective layer, and also having a luminous reflectance of 0.6% or less.

In cases in which no antireflective layers are formed on the sapphire glass substrate as in Comparative Examples 1, 3, and 5, it is clear that the luminous reflectance is high and the solar battery power generation efficiency is low.

In cases in which an antireflective layer is formed on only one side of the sapphire glass substrate as in Comparative Examples 2, 4, and 6, it is clear that the solar battery power generation efficiency is greater than in Comparative Examples 1, 3, and 5, but the luminous reflectance is greater than in Working Examples 1 to 33, and it is not possible to achieve both visibility and solar battery power generation efficiency.

What is claimed is:

1. A timepiece cover glass used in a timepiece in which a solar battery is provided, the timepiece cover glass covering the solar battery, the timepiece cover glass comprising:

an antireflective layer being formed on at least both sides of the timepiece cover glass,
    reflectance of the timepiece cover glass being a smallest for light with a first wave length,
    a sensitivity of the solar battery being largest for light with a second wave length,
    an absolute value of a difference in nano meter being equal to or less than 40 nano meter,
    the difference being between a largest wave length and a smallest wave length among the first wave length in nano meter, the second wave length in nano meter, and a wave length of 550 nano meter,
    a luminous reflectance of the timepiece cover glass being 0.6% or less, the luminous reflectance being an average value of reflectances of reference light at wavelengths of a visible light range, which are modified according to luminosity.

2. The timepiece cover glass according to claim 1, wherein the wavelength considered to be the wavelength exhibiting the minimum reflectance is a center wavelength between two points on the reflectance curve that is intersected by a straight line running parallel to the wavelength axis at a reflectance of 2%.

3. The timepiece cover glass according to claim 1, wherein he antireflective layer is an inorganic multilayer film obtained by a high-refraction layer and a low-refraction layer being stacked in an alternating fashion.

4. The timepiece cover glass according to claim 3, wherein the high-refraction layer comprises silicon nitride and the low-refraction layer includes silicon oxide.

5. A timepiece characterized in comprising the timepiece cover glass according to claim 1.

* * * * *